H. C. MILLER.

COMBINED STAND AND HORN FOR TALKING MACHINES.

APPLICATION FILED APR. 27, 1909.

Reissued Nov. 23, 1909.

13,044.

3 SHEETS—SHEET 1.

WITNESSES:

G. M. Copenhaver

Harry F. Rueth

INVENTOR

Harry C. Miller

BY Horace Pettit

ATTORNEY.

H. C. MILLER.

COMBINED STAND AND HORN FOR TALKING MACHINES.

APPLICATION FILED APR. 27, 1909.

Reissued Nov. 23, 1909.

13,044.

3 SHEETS—SHEET 2.

WITNESSES:

G. M. Copenhaver

Harry F. Rueth

INVENTOR

Harry C. Miller

BY Horace Pettit

ATTORNEY

H. C. MILLER.

COMBINED STAND AND HORN FOR TALKING MACHINES.

APPLICATION FILED APR. 27, 1909.

Reissued Nov. 23, 1909.

13,044.

3 SHEETS—SHEET 3.

WITNESSES:

G. M. Copenhaver

Harry F. Rueth

INVENTOR

Henry C. Miller

BY Horace Pettit

ATTORNEY.

UNITED STATES PATENT OFFICE.

HENRY C. MILLER, OF WATERFORD, NEW YORK, ASSIGNOR, BY MESNE ASSIGNMENTS, TO VICTOR TALKING MACHINE COMPANY, OF CAMDEN, NEW JERSEY, A CORPORATION OF NEW JERSEY.

COMBINED STAND AND HORN FOR TALKING-MACHINES.

13,044. Specification of Reissued Letters Patent. Reissued Nov. 23, 1909.

Original No. 793,013, dated June 20, 1905, Serial No. 235,722, filed December 6, 1904. Divided and this application for reissue filed April 27, 1909. Serial No. 492,481.

DIVISION B.

*To all whom it may concern:*

Be it known that I, HENRY C. MILLER, a citizen of the United States, residing at Waterford, in the county of Saratoga and State of New York, have invented new and useful Improvements in a Combined Stand and Horn f r Talking-Machines, of which the following is a specification, this application being a division of another application filed by me June 20, 1907, Serial No. 379,993.

This invention relates to improvements in a combined stand and horn for a talking-machine.

Talking-machines now in use employ a horn extending out from the sound box, which is large, unsightly, and frequently takes up so much room that it is in the way. I have found that it is not essential to extend the horn from the machine and have therefore constructed a cabinet in which the talking-machine is placed and utilize the interior of the cabinet to accommodate a horn, and a deflector to distribute the sound. The object of combining these two elements is to economize space and at the same time provide means for utilizing a large horn without projecting it out from the talking-machine, as practiced with machines of this type now is use.

A further object of this invention is to provide a stationary horn in a cabinet with an adjustable exit that the sound may be directed to an audience at any angle.

Other objects and advantages will be hereinafter referred to and be particularly pointed out in the claims.

Figure 1:
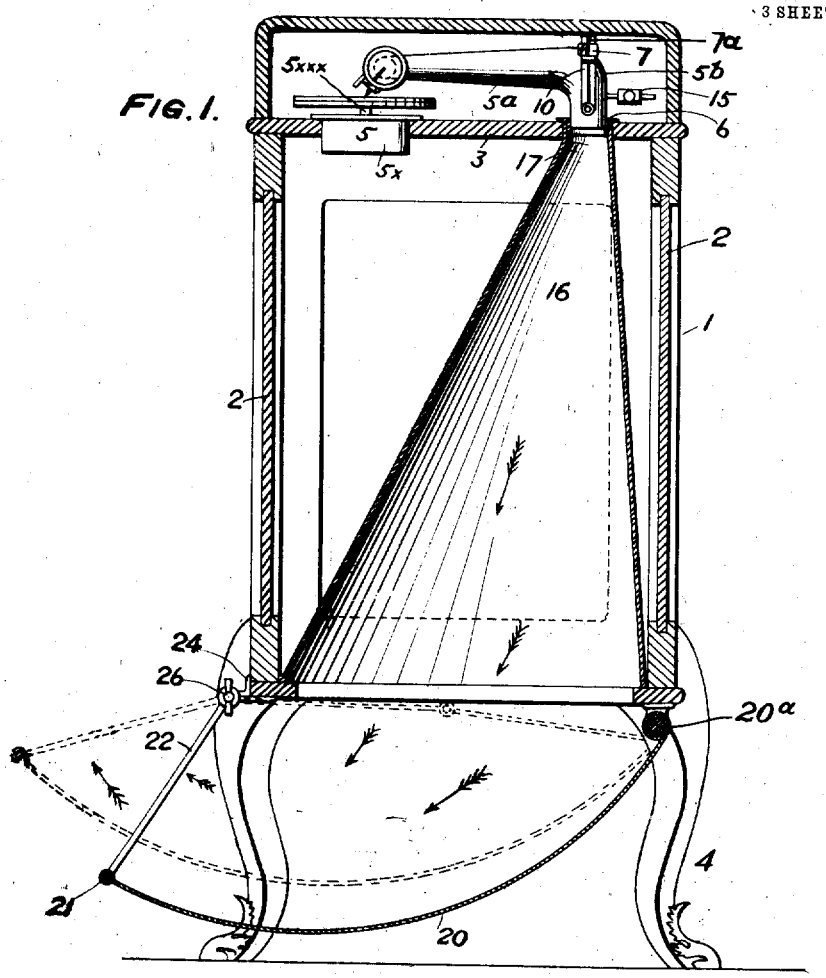
Figure 2:
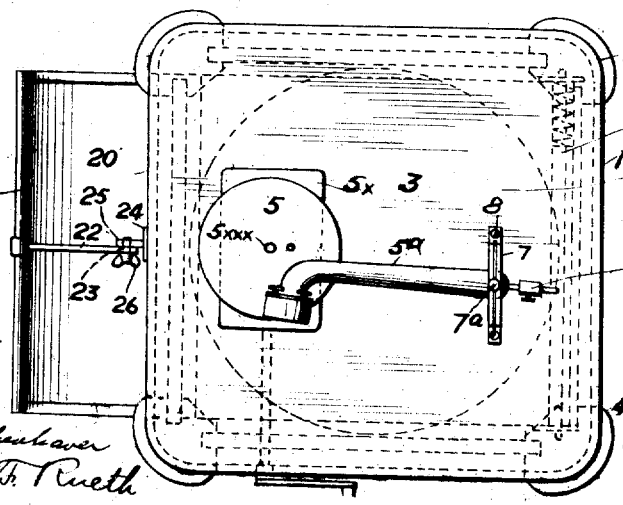
Figure 4:
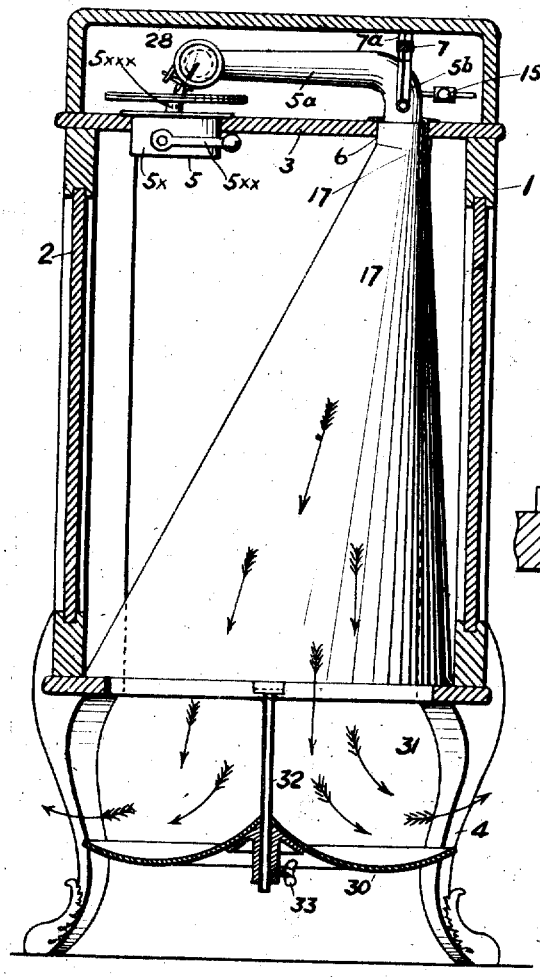
Figure 3:
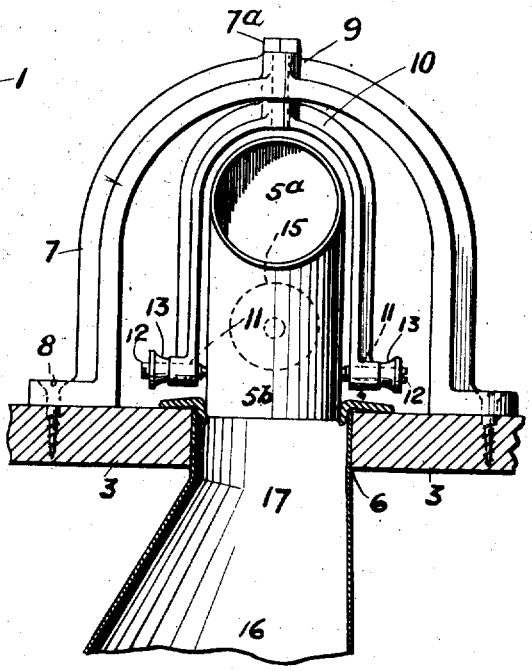
Figure 5:
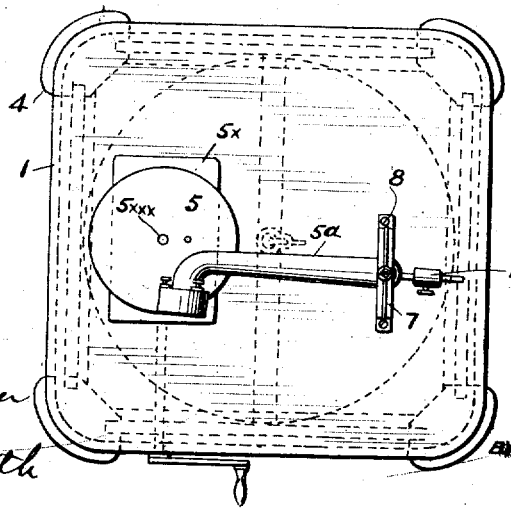
Figure 6:
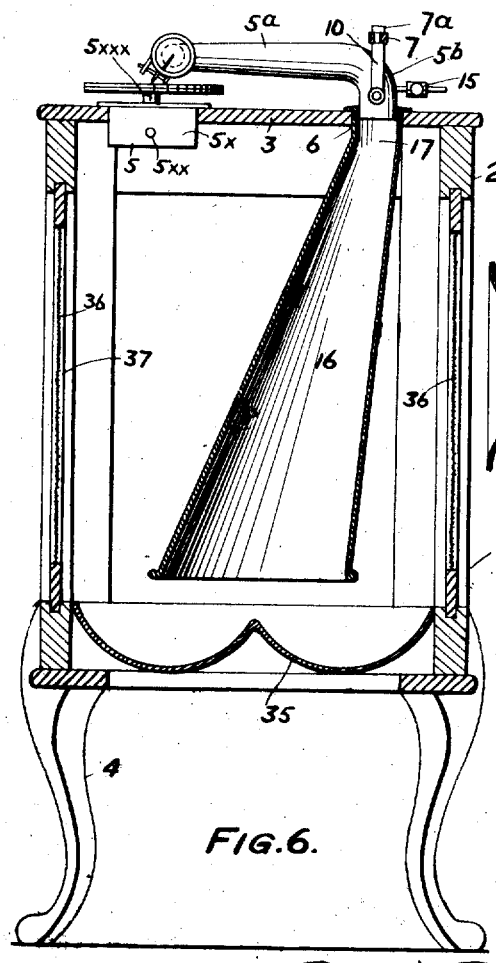
Figure 7:
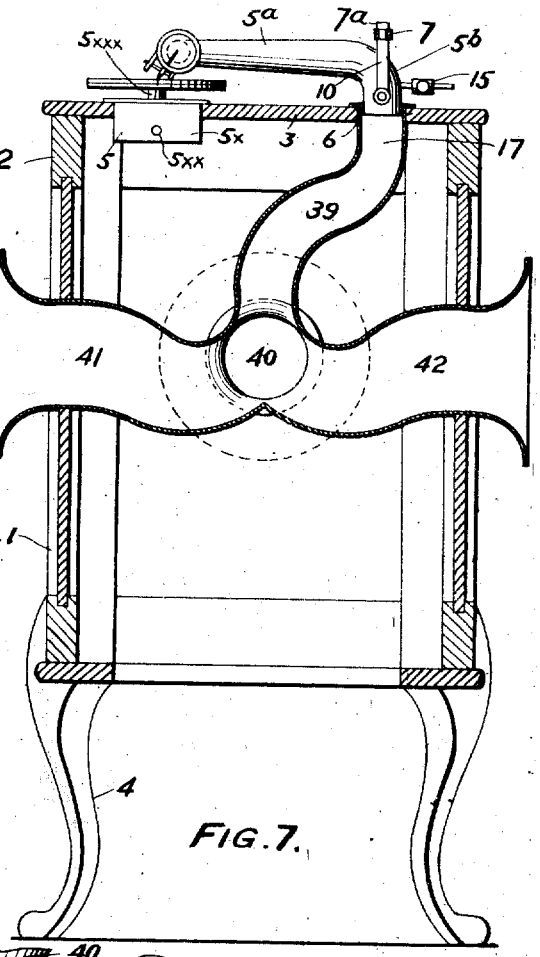
Figure 8:
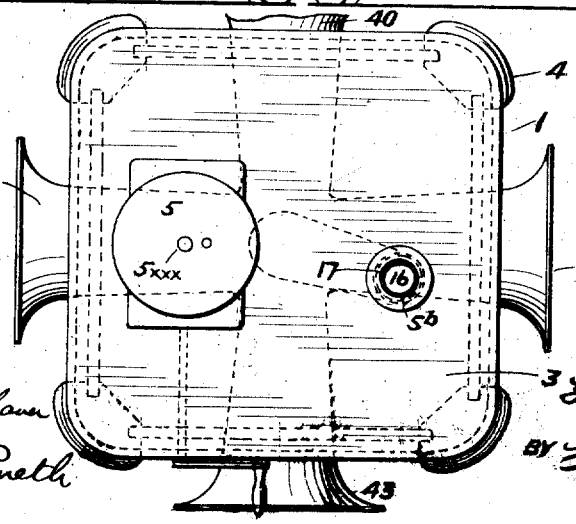

In the drawings, Figure 1 is a sectional view of the preferred form of my invention. Fig. 2 is a top plan view with the cover removed. Fig. 3 is a detail transverse vertical section of the means employed for supporting the pipe leading from the talking-machine to the horn and the connection between the pipe and the horn. Fig. 4 is a vertical sectional view of a modified form of my invention. Fig. 5 is a plan view of the same. Fig. 6 is a vertical section of a different modification. Fig. 7 is a similar view of a further modification. Fig. 8 is a plan view of the modification shown in Fig. 7.

The numeral 1 indicates a cabinet composed of sides 2, top or support 3, and legs 4. The top 3 is cut out to receive a talking machine 5, which may be of any well-known type, and connected to the sound-box is a tube $5^a$, having the outer end $5^b$ turned down. The talking machine includes a casing $5^x$, extending within the cabinet below the support 3, and includes operating means, parts of which are indicated by the handle $5^{xx}$, and the disk post $5^{xxx}$. An opening 6 is formed in the top 3 opposite the talking-machine, and straddling the opening is a yoke 7, fastened in place by screws 8, and provided at about its center with a vertical opening 9, the center of said opening being coincident with the center of the opening 6. A smaller yoke 10 is swiveled to the yoke 7 by a bolt $7^a$, passing through the opening 9, and at the terminals of the yoke 10 are alined openings 11 11 to receive pointed screws 12 12, which receive lock nuts 13 13. The points of the screws 12 bind the turned-down end $5^b$ of the tube $5^a$ to fasten the latter to the yoke 10. This construction permits the tube to turn horizontally, the screw $7^a$ being the pivotal connection. A weight 15, is mounted on a rod extending from the tube to counterbalance the tube and the sound box.

16 indicates a horn made conical, its smaller end 17, fitting in the opening 6 and its larger end or mouth extending to the bottom of the cabinet 1. A suitable packing is interposed between the turned-down end $5^b$ of the tube $5^a$ and the upper end 17 of the horn. Obviously the purpose of the packing is to prevent the escape of sound at this point.

Connected to the bottom of the cabinet and communicating with the horn is arranged an adjustable flexible sound-deflector 20. The deflector may be secured to the bottom of the cabinet in any suitable manner, but preferably by a spring-roller $20^a$, and at its front end is a bar 21, having connected to it an arm 22, provided with an opening 23. Adjacent the arm is a bracket 24, fastened to the cabinet and formed with an opening 25. A set-screw 26 passes through the openings 23 and 25 to set the mouth of the deflector at a convenient angle. By making the deflector of flexible material it can be rendered adjustable without the necessity of making joints, &c., which would retard the sound waves.

The spring-roller 20[a] is of the usual type and can be used to roll the deflector under the cabinet when not in use.

While I have described one form of means for holding the deflector after it has been adjusted, I desire it to be distinctly understood that it is in no wise intended as a limitation.

28 indicates a cover hinged to the cabinet to shield the talking-machine.

In operation the talking-machine is started and the sound passes through the tube 5[a] to the horn 16, thence to the deflector, and out to the atmosphere. The sound striking the deflector is thrown out into the atmosphere in a soft blended tone. The "brassy" sound so prevalent with talking-machine horns is almost entirely removed.

By swiveling the tube at one end, as described, the end of said tube and the horn are always retained in alinement.

In the modification shown in Figs. 4 and 5 the horn 16 and its connection with the talking-machine are the same as in Figs. 1 to 3; but the deflector is made in the form of a concavo-convex disk 30, and the space 21 is formed between the bottom of the horn and the disk for the exit of sound. The disk is formed with a central hole which receives a standard 32, depending from the bottom of the cabinet, the disk being secured to the standard by a set-screw 33, so that the column of sound emitted through the space 31 can be quickly and conveniently controlled.

In the form of my invention shown in Fig. 6 a concavo-convxe disk 35 is located inside the cabinet 1, and the sound passes to the atmosphere through opening 36, covered with net or fine gauze 37. In many instances this construction gives decidedly satisfactory results; but by reason of it not having an adjustable deflector the sound cannot be regulated.

From the foregoing it will be seen that I have provided a simple and neat stand for a talking-machine and have also arranged a convenient means for accommodating the horn. Such a construction as before stated, absolutely removes the unsightly and awkward appearance of the horn extending from the talking machine. Furthermore, by providing the adjustable deflector the range, tone, and volume of sound are under perfect control of the operator.

In Figs. 7 and 8 I have provided the horn 39 with four branches 40, 41, 42 and 43, a branch passing through an opening in each side of the cabinet and forming a deflector. The area of the branch tubes about equals the area of one of the big horns shown in Fig. 1, so that the sound produced is equal in volume to the preferred form.

What I claim is:—

1. In a talking machine, the combination with a record, of a coöperating reproducer, a horizontal stationary amplifier connected with the reproducer, and means for preventing extraneous vibration of the amplifier.

2. In a talking machine, the combination with a record, of a coöperating traveling reproducer, an amplifier connected with the reproducer, and an inclosure below the record within which is horizontally positioned the major portion of the amplifier.

3. In a talking machine, the combination with a record operating in a fixed position of a coöperating traveling reproducer, an amplifier connected with the reproducer and an inclosure supporting the major portion of the amplifier in a fixed horizontal position, and preventing extraneous vibration of said amplifier.

4. In a talking machine, the combination with a record, of a reproducer, means for producing a relative movement of said record and reproducer whereby sound is reproduced, an amplifier connected with the reproducer and shaped to cause travel of the sound waves through two substantially parallel planes, one of said planes lying above the record and the other below, and means for preventing extraneous vibration of the amplifier.

5. In a talking machine, the combination with a record, of a reproducer, means for producing a relative movement of said record and reproducer whereby sound is reproduced, and an amplifier connected with the reproducer and shaped to cause travel of the sound waves through two substantially parallel planes, one of said planes lying above the record and the other below.

In witness whereof I have hereunto set my hand this 23 day of April, A. D. 1909.

HENRY C. MILLER.

Witnesses:

JNO. IMIRIE,

ERNEST A. LIEBERMANN.